UNITED STATES PATENT OFFICE 2,551,484

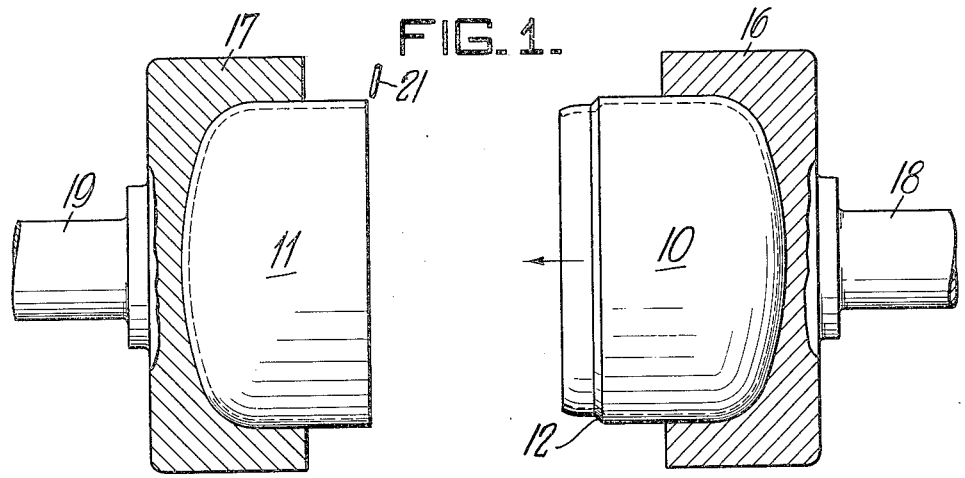
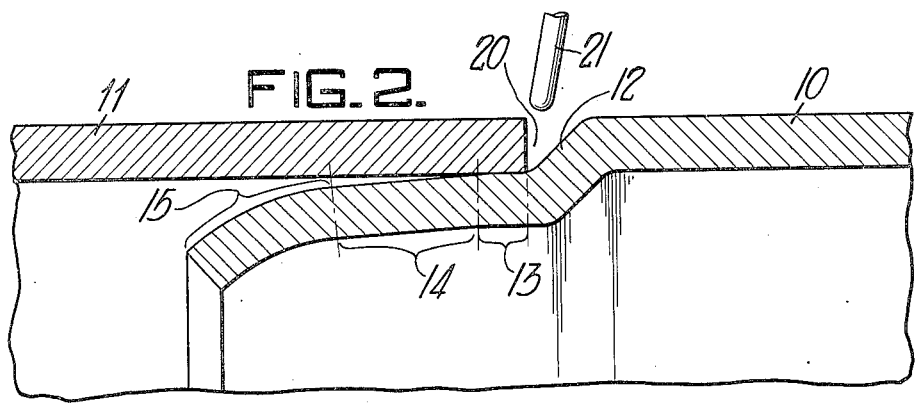
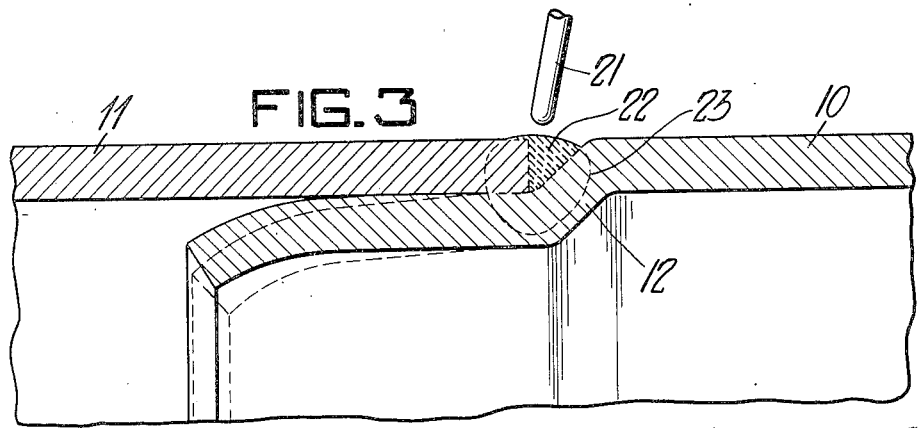

METAL CASK OR TANK WITH BELT WELD

Delos J. Branning, Pittsburgh, Pa., assignor to National Tube Company, a corporation of New Jersey Application March 24, 1948, Serial No. 16,748

1 Claim. (Cl. 220—75)

This invention relates to a container and, in particular, to a generally cylindrical container having a relatively thin wall, composed of a pair of sheet-metal stampings connected by a welded spigot joint.

Small containers adapted to contain fluid under moderate pressure are used extensively, e. g., for storage of liquified fuel gas for household purposes. They are commonly made by drawing cup-shaped half-sections from flat stock of suitable gage and welding two of them together at a spigot joint. To form the joint, the edge of one half-section is given a slight inward bevel reducing the outside diameter at the edge to or below the inside diameter of the edge of the other section so the former or male section will fit within the latter or female section for mating to provide a lap joint suitable for receiving a belt of deposit welding. For most economical manufacture, machine assembly of the sections is desirable but this has proved impossible heretofore. Automatic welding is also desirable but this imposes the necessity of a tight fit between sections prior to welding to prevent leakage of fused weld metal and oxidation by ambient air as the welding proceeds. The former is necessary because a definite amount of metal is deposited per second in automatic welding, the exact amount being correlated with the speed of travel of the work, and if leakage of metal occurs, the joint may be defective requiring costly patching or touching up by hand.

Because of the need for a tight fit, considerable difficulty has been encountered in mating the male and female half-sections preparatory to welding and much manual labor has been required to accomplish this result. The difference between the outside diameter of the male section and the inside diameter of the female section must necessarily be kept at a minimum to secure the desired tight fit therebetween. Sheet metal of the thickness employed, however, say 12 or 14 gauge, when drawn into a generally cylindrical cup, tends to depart from truly circular shape at the edge and any such variation or eccentricity is obviously fatal to ready mating. It has accordingly been necessary heretofore to fit the sections together by hand, hammering down any eccentric portion of the edge of the male section. An alternative procedure which has been followed is to heat the female section and thereby expand it to receive the male section, resulting in a shrink fit. In either case, the sections, after manual assembly, are transported from the point of assembly to the welder. They must first be tack- welded at several points, however, to prevent them from separation during handling incident to transporting and placing them in the automatic welder which subsequently effects a continuous weld at the joint. High cost and limited production are obvious accompaniments of the method described above and it is accordingly the object of my invention to overcome these disadvantages and provide for quick and easy assembly of the container sections by machine, preparatory to automatic welding.

In a preferred embodiment and practice of the invention, I impart a novel shape to the edge or joint-end of the male section whereby it may be easily introduced into the female section, accurately guided home despite any eccentricity and eventually seated firmly so as to make a tight fit therewith, all as a result of simply aligning the sections coaxially and mechanically pressing them together. The final fit thus obtained is sufficiently tight to exclude air and avoid oxidation during automatic welding, as well as to prevent any leakage of weld metal through the joint. Specifically, I provide on the edge or joint-end of the male section, by a suitable rolling operation, first an offset, frusto-conical or necked-in connecting portion, then a cylindrical or seating portion having an outside diameter substantially equal to the inside diameter of the female section. Beyond the cylindrical portion there is a tapering guiding portion having a much smaller angle of slope than the frusto-conical portion. Finally, at the extreme edge or joint-end of the male section, I form an entering portion having the shape of a surface of revolution generally hyperboloid or spherical in character. The minimum outside diameter of the entering portion of the male section is made less than any minimum inside diameter of the edge or joint-end of the female section likely to exist by reason of eccentricity of the edge resulting from the drawing of the section.

In a preferred practice of my improved method of making containers, the male and female sections are located in opposed spaced relation, in alignment on a common axis, and then mated simply by applying axial thrust. The sections thus assembled are then automatically welded at the lap joint therebetween while the sections are held together in the location where they were assembled, without any bodily movement, thereby obviating the need for preliminary tack welding. Preferably the sections are assembled by placing them in the heads of an automatic welder and causing one of the heads to move toward the other. When the sections have been assembled, the joint is welded by rotating the heads and making a continuous deposit weld in the form of a belt about the middle of the container. The invention thus makes possible the machine assembly of the sections and, as a result, the container is completed at the point of original assembly and intermediate transport and handling are eliminated.

A novel result characteristic of my improved container and method is that, on deposition of a belt of weld metal between the edge or joint end of the female section and the frusto-conical, necked-in or offset portion of the male section, a fusion weld is also effected between the former and a part of the tapering guiding portion of the male section. This provides a joint of great strength which remains gas-tight even under high pressure.

A complete understanding of the invention may be obtained from the following detailed description and explanation which refer to the accompanying drawings illustrating a preferred embodiment and practice. In the drawings, Figure 1 is a vertical section through the common axis of a pair of spaced welder heads, each having therein a cup-shaped half-section drawn from sheet metal, one male and one female, for mating preparatory to welding;

Figure 2 is a partial section through the mating edges of the half-sections to enlarged scale before welding; and Figure 3 is a view similar to Figure 2 showing the completed weld.

Referring in detail to the drawings, I provide male and female half-sections 10 and 11, generally cup-shaped, adapted on mating by means of a spigot joint to form a container of the desired dimensions, specifically a cask or small tank. The half-sections may conveniently be formed by drawing flat stock of 12 or 14 gauge between suitable dies. As shown, the sections 10 and 11 have a cylindrical side wall and a convex or dished end.

After the half-sections have been drawn to cup-shape, the edge of the male section is shaped by a suitable rolling operation to form a spigot joint-end thereon which facilitates mating thereof with the female section. As best shown in Figure 2, the side wall of the male section 10 adjacent the edge is first deformed inwardly to provide a contracted neck or frusto-conical connecting portion 12. Beyond the neck 12 the edge of the half-section has a cylindrical portion 13 of reduced diameter and relatively short in axial length. The outside diameter of this cylindrical or seating portion is substantially the same as the inside diameter of the female section. Beyond the seating portion 13 the edge of the male section has a guiding portion 14 which is frusto-conical but has a much smaller degree of taper than the neck portion 12. The extreme edge or entering nose of the male section has the shape of a surface of revolution, as indicated at 15. It may be either spherical or hyperboloid in character.

The assembly of the sections 10 and 11 is accomplished by placing them in spaced opposed welder heads shown diagrammatically in Figure 1 at 16 and 17, having shafts 18 and 19 mounted for rotation in suitable bearings (not shown). One of the heads is mounted for axial movement toward and from the other. As shown, the heads 16 and 17 have their adjacent faces recessed to accommodate the convex ends of the sections 10 and 11, making a snug fit therewith. It is not necessary that any particular care be exercised in placing the half-sections in the heads. As a matter of fact, they will fit snugly therein only if disposed substantially coaxially. This automatically insures alignment of the sections with sufficient accuracy for proper mating on advance of one of the heads, e. g., the one designated 16, toward the other. Thus, when the half-sections have been placed in the heads, they are brought into properly assembled relation for welding merely by advancing the head 16 toward the other.

It will be noted from Figure 2 that the minimum outside diameter of the entering portion 15, i. e., the outside diameter at the extreme edge, is considerably less than the inside diameter of the female section 11. This facilitates entry of the shaped edge of the male section regardless of any slight eccentricity or departure from true circular shape which may characterize the edge or joint-end of the female section. Once the entering portion 15 has passed the edge of the female section, the latter rides up on the guiding portion 14 and finally makes a tight fit with the seating portion 13 as the male section is pushed home and the edge or joint-end of the female section engages the contracted neck or connecting portion 12 of the male section which limits relative movement of the two sections. When thus assembled, a V-shaped groove 20 is formed between the edge of the female section 11 and the connecting portion 12 of the male section to accommodate a belt of weld metal deposited therein by automatic welder mechanism mounted between the heads 16 and 17, the electrode of which is indicated at 21. It will be apparent that loss of weld metal through the joint between the sections is prevented by the snug fit between the seating portion 13 of the male section 10 and the extreme edge of the female section 11.

While continuing to apply pressure to the movable head 16 to maintain the sections 10 and 11 in proper relation for welding, both heads are rotated and the welding mechanism is brought into operation to form a continuous belt weld, as shown in Figure 3. Any suitable method of welding may be employed, but submerged arc welding is preferred. The result of this operation is to fill the groove 20 with a continuous bead of weld metal 22 and also to heat the abutting portions of the half-sections within the dotted line 23 to fusion temperature whereby the latter are welded together directly under the existing pressure, in addition to being united by the deposited metal. The welding heat also causes the entering portion 15 of the male section to expand from the dotted-line position shown in Figure 3 to the position shown in solid lines. As soon as the starting point of the weld has made a complete revolution and a continuous belt weld has been thereby effected between the sections 10 and 11, the welding current is cut off, the head 16 is retracted and the resulting unitary container is removed from the welder on retraction of head 16, and passed on for any desired finishing operations.

It will be apparent from the foregoing that the invention is characterized by numerous advantages over welded containers as previously constructed and the method by which they were made. In the first place, the invention permits the half-sections to be assembled by machine, i. e., after being placed in the welder heads by hand, all that is necessary to bring them into proper relation for welding is to advance one head toward the other by power means, e. g., a pneumatic cylinder and piston. The shape of the edge or joint-end of the male section insures easy entry and proper mating engagement of the two sections when simply pushed together. No hammering is required to insure proper mating and heating to obtain a shrink fit is likewise obviated. The welding operation being effected at the point of initial assembly of the half-sections, no preliminary tack-welding thereof is necessary and the handling or transport formerly necessary between the point of assembly and the welder is eliminated. The joint between the assembled sections is sufficiently tight before welding to prevent leakage of weld metal, thus avoiding the necessity for patching or touching up by hand after the continuous welding operation. The shaped edge of the male section affords an interior reinforcing band which greatly strengthens the container against denting by impact blows suffered as a result of falling or rough handling in service. The effectiveness of this reinforcing is increased by the expansion of the portions 14 and 15 of the male member under the welding heat as explained above.

Although I have illustrated but a preferred embodiment and practice of the invention, it will be recognized that changes in the details of structure and procedure disclosed may be made without departing from the spirit of the invention or the scope of the appended claim.

I claim:

A container comprising a pair of generally cup-shaped sheet-metal sections connected by a spigot joint, one section having a female joint-end, the other section having a male joint-end cooperating therewith and including an inner frusto-conical neck, a cylindrical seating portion outwardly of said neck, a frusto-conical guiding portion outwardly of said seating portion having a vertex angle smaller than that of said neck, and a rounded entering nose at the outer extremity, having the shape of a surface generated by revolution of a smooth curve about the axis of said other section and a minimum outside diameter less than the minimum inside diameter of said female joint-end likely to exist as a result of eccentricity thereof, to facilitate making said joint, said female joint-end fitting tightly on said seating portion when said joint is made, abutting said frusto-conical neck and forming therewith a groove extending circumferentially of the container, said sections being united by a continuous belt of weld metal deposited in said groove and a continuous circumferential zone adjacent and merging into said belt in which the contacting surfaces of said sections are fused together.

DELOS J. BRANNING.

REFERENCES CITED

The following references are of record in the file of this patent:

UNITED STATES PATENTS

| Number | Name | Date |
|---|---|---|
| 1,044,742 | Carnes | Nov. 19, 1912 |
| 1,485,408 | Miller | Mar. 4, 1924 |
| 1,485,555 | Daykin | Mar. 4, 1924 |
| 2,350,720 | Brodie | June 6, 1944 |
| 2,364,216 | Hopwood | Dec. 5, 1944 |
| 2,372,712 | Crawford | Apr. 3, 1945 |
| 2,386,246 | Mapes | Oct. 9, 1945 |
| 2,412,271 | Kercher | Dec. 10, 1946 |
| 2,421,460 | Marker et al. | June 3, 1947 |